United States Patent [19]
Tanaka

[11] 3,817,596
[45] June 18, 1974

[54] LIGHT REFLECTOR AND METHOD OF DIFFUSING THE REFLECTING LIGHT OF A LIGHT REFLECTOR

[75] Inventor: Morimasa Tanaka, Kanagawa, Japan

[73] Assignee: Ichiko Industries Limited, Tokyo, Japan

[22] Filed: June 30, 1972

[21] Appl. No.: 268,025

[30] Foreign Application Priority Data
July 7, 1971   Japan.................................. 46-49606

[52] U.S. Cl...................... 350/103, 350/109, 404/9
[51] Int. Cl............................................. G02b 5/12
[58] Field of Search............................ 350/97–109; 94/1.5; 404/9–16

[56] References Cited
UNITED STATES PATENTS

| | | | |
|---|---|---|---|
| 1,671,086 | 5/1928 | Stimson | 350/103 |
| 1,743,834 | 1/1930 | Stimson | 350/102 |
| 1,743,835 | 1/1930 | Stimson | 350/103 |
| 2,119,992 | 6/1938 | Johnson | 350/104 |
| 2,723,595 | 11/1955 | Rupert | 350/103 |
| 3,712,706 | 1/1973 | Stamm | 350/103 |

Primary Examiner—Ronald L. Wibert
Assistant Examiner—Michael J. Tokar
Attorney, Agent, or Firm—Wenderoth, Lind & Ponack

[57] ABSTRACT

A light reflector which diffuses its reflecting light rays received from external light sources such as headlight lamps of vehicles, is disclosed. The reflector comprises a light transmitting reflecting member made of a synthetic resin and having a smooth front surface and a rear face with a number of reflecting elements formed in adjacent relation thereon, each of said reflecting elements being comprised of three reflecting planar surfaces arranged so that their normal lines deviate by a desired angle from the optical axes X, Y, Z of the element which cross each other at right angle, whereby the light rays reflected and emitted from these elements are not reflected in a line parallel to the light rays incident to the respective reflecting elements.

1 Claim, 6 Drawing Figures

LIGHT REFLECTOR AND METHOD OF DIFFUSING THE REFLECTING LIGHT OF A LIGHT REFLECTOR

BACKGROUND OF THE INVENTION a. Field of the Invention

The present invention is concerned with a light reflector for reflecting the light received from external light sources such as the headlight lamps of vehicles or the like, and more particularly it relates to light reflectors which are attached, as signal or caution marks, to the body of an automobile and other vehicles or which are installed at one or both sides of a road to serve as signal or caution marks.

b. Description of the prior art

Light refelctors for use on the bodies of automobiles and other vehices or those for roads, which are being used in general comprise a reflecting member made of a molded transparent synthetic resin having a smooth front surface and a rear surface with numerous reflecting elements formed thereon. These reflecting element are each comprised of three tiny reflecting planar surfaces arranged perpendicular to each other. These reflecting elements are arranged so that the light rays incident to the first reflecting plane of the element are reflected therefrom onto the second reflecting plane, and the light rays reflected from this second plane impinge onto the third reflecting plane to be reflected therefrom for emission into the space.

However, the reflecting elements of known light reflectors arranged in the manner described above function in such a way that the incident light rays received by the elements from external light sources are reflected into space in a direction parallel with said incident light rays. Thus, such a known light reflector is so arranged that its reflecting elements per se are not capable of diffusing the light rays received from external light sources. Therefore, the front surface of the reflecting member is given a semi-spherical or arcuate facial shape to diffuse and distribute the emitting reflected light rays. However, in order to enlarge the diffusion angle of reflecting light rays by means of such a curved front surface, it is necessary that the radius of this semi-spherical or arcuate surface be reduced considerably. Accordingly, a reflecting member having such a small radius is not suitable for use with a light reflector having a large external diameter. For example, if the pitch or distance between the respective adjacent pointed projections of the mold for molding the reflecting member (these projections are intended to form the reflecting elements) is 2.3 mm and if it is intended to diffuse the reflecting light rays through an angle of 1°, it is necessary that the semi-spherical or arcuate surface of the reflector have a radium of about 60 mm. Thus, such a reflector necessarily cannot be applied to one having an outer diameter of more than 60 mm. On the other hand, in case the reflector has an outer diameter smaller than 60 mm, namely if for example the outer diameter is 50 mm, such a reflector will inevitably have an ugly bulging front surface and is not suitable for practical use.

Needless to say, a light reflector of the type described has to be capable of being viewed well at a long distance in order to secure the driving safety of vehicles during night or whenever it is dark. However, this light reflector is required to be viewed even better at a short distance rather than at a long distance.

However, as stated above, a conventional reflector is designed to diffuse the reflected light only at the semi-spherical or arcuate plane of the front surface of the reflecting member. Accordingly, the illumination degree of the reflecting light rays will be extremely high only when the observation angle is in the vicinity of 0°. As this observation angle exceeds 1°, however, the degree of illumination of the reflecting light will show a sharp decrease. For this reason, the conventional light reflector is visible clearly only at a long distance at which the observation angle is small. However, the illumination degree of the reflecting light will decrease substantially when viewed at a short distance at which the observation angle is great. As such, the visibility of such a light reflector of the prior art may, after all, be substantially the same for both long distance and short distance, because of the fact that the visibility at a close distance which should otherwise be better is not much different as compared with the visibility at a long distance.

SUMMARY OF THE INVENTION

It is, therefore, a primary object of the present invention to provide a new light reflector which is capable of diffusing the reflecting light rays by the reflecting elements per se of a reflecting member.

Another object of the present invention is to provide a light reflector which provides a good visibility at a long distance, and also a better visibility at a short distance at which the observation angle is greater than at a long distance.

Still another object of the present invention is to provide a method of diffusing the reflecting light rays of a light reflector, which permits the relative characteristic between the illumination degree of the reflecting light rays and the observation angle to be selected as desired at the time of designing the reflector.

A further object of the present invention is to provide a light reflector and also a method of diffusing the reflecting light rays of the light reflector, which permits the angle of diffusion of the reflecting light rays to be set at a desired value, irrespective of the size of the outer diameter of the light reflector to which this method is applied.

These and other objects as well as the attendant advantages of the present invention will become apparent by reading the following description of the embodiments when taken in conjunction with the accompanying drawings.

BRIEF DESCRIPTION OF THE DRAWINGS

FIGS. 3 and 4 are explanatory illustrations of two examples of reflecting element of reflector according to the present invention in which:

FIG. 3 is an illustration of a reflecting element wherein the normal lines of the respective reflecting planes of the reflecting element cross each other on the positive (+) side of such optical axes X, Y, Z of the element that cross each other at right angle; and FIG. 4 is an illustration of a modification of reflecting element wherein the normal lines of the respective reflecting planes cross each other on the negative (−) side of the optical axes X, Y, Z.

DETAILED DESCRIPTION OF THE PREFERRED EMBODIMENTS

Figure 1:
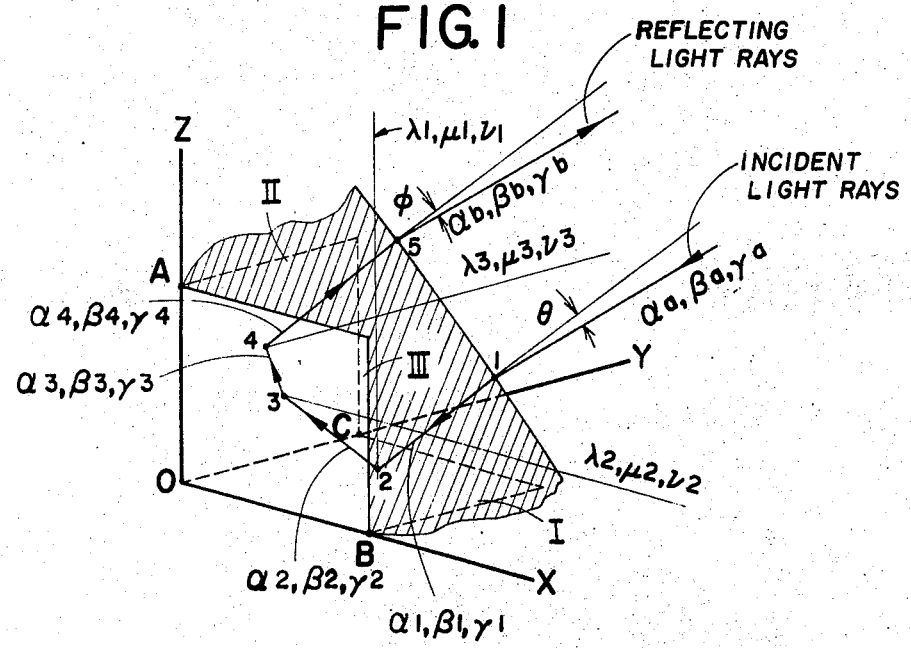
FIG. 1 is an explanatory illustration showing the reflecting element of a conventional light reflector.
Figure 2:
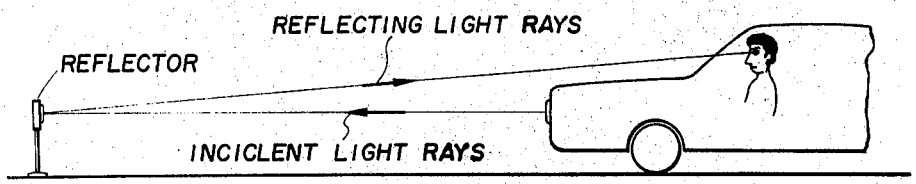
FIG. 2 is a side elevation showing the state in which the light reflector is being irradiated by the light rays from a headlight lamp of an automobile, and the state in which the light reflected at the reflecting surface of the reflector is viewed by the driver.

Prior to describing the present invention, an explanation is first made on the reflecting element of the conventional light reflector. FIG. 1 shows an optical system of the conventional reflecting element which is comprised of a right-angled trigonal pyramid member. Incident light rays enter into the reflector member after the rays are refracted at the surface of this reflecting member. These refracted light rays are then reflected at the three reflecting planes (I), (II) and (III) of the reflecting element, respectively. These reflecting light rays are then reflected into space from the surface of the reflecting member after being refracted thereat. In order to show the course of the changes in direction of the light rays, assume that the apex of the pyramid of this reflecting element is designated by origin O, and that the edge lines of the reflecting planes (I), (II) and (III) are indicated by OA, OB and OC, respectively. It will be understood that the edge lines OA, OB and OC are in agreement with the optical axes Z, X and Y which cross each other at right angle, respectively. In other words, the plane (I) of the reflecting element represents the plane XY, the plane (II) represents the plane YZ and the plane (III) represents the plane XZ. Let us also assume that when light rays of direction cosines $\alpha_a$, $\beta_a$ and $\gamma_a$ impinge onto this reflecting member and are refracted at its surface, their direction cosines are expressed by $\alpha_1$, $\beta_1$ and $\gamma_1$, and that when these refracted light rays are reflected at the plane (I) of the normal lines ($\lambda_1$, $\mu_1$, $\nu_1$), the plane (II) of the normal lines ($\lambda_2$, $\mu_2$, $\nu_2$) and the plane (III) of the normal lines ($\lambda_3$, $\mu_3$, $\nu_3$), respectively, the direction cosines of these respective reflecting light rays are expressed by ($\alpha_2$, $\beta_2$, $\Gamma_2$), ($\alpha_3$, $\beta_3$, $\gamma_3$), and ($\alpha_4$, $\beta_4$, $\gamma_4$), and also that when these light rays are emitted from the reflecting member, the direction cosines of the emitting light rays are expressed by ($\alpha_b$, $\beta_b$, $\gamma_b$). Then, these direction cosines ($\alpha_b$, $\beta_b$, $\gamma_b$) can be obtained from computations according to the following equations. In these computations, let us assume that the direction cosines of the normal lines of the surfaces of the reflecting element are expressed by ($\lambda$, $\mu$, $\nu$) and that the refractive index of the material with which the reflecting member is made is 1.5.

$$\begin{pmatrix}\alpha_1\\\beta_1\\\gamma_1\end{pmatrix}=\frac{1}{1.5}\begin{pmatrix}\alpha_a-\lambda\cos\theta\\\beta_a-\mu\cos\theta\\\gamma_a-\nu\cos\theta\end{pmatrix}-\begin{pmatrix}\lambda\\\mu\\\nu\end{pmatrix}\sqrt{1-1.5^2(1-\cos^2\theta)}$$
$$\cos\theta=\alpha_a\cdot\lambda+\beta_a\cdot\mu+\gamma_a\cdot\nu \quad (1)$$

$$\begin{pmatrix}\alpha_2\\\beta_2\\\gamma_2\end{pmatrix}=\begin{pmatrix}\alpha_1\\\beta_1\\\gamma_1\end{pmatrix}-2\begin{pmatrix}\lambda_1\\\mu_1\\\nu_1\end{pmatrix}\cos\omega_1$$
$$\cos\omega_1=\alpha_1\cdot\lambda_1+\beta_1\cdot\mu_1+\gamma_1\cdot\nu_1 \quad (2)$$

wherein:
$\omega_1$ represents the angle formed by ($\alpha_1$, $\beta_1$, $\gamma_1$) and ($\lambda_1$, $\mu_1$, $\nu_1$).

$$\begin{pmatrix}\alpha_3\\\beta_3\\\gamma_3\end{pmatrix}=\begin{pmatrix}\alpha_2\\\beta_2\\\gamma_2\end{pmatrix}-2\begin{pmatrix}\lambda_2\\\mu_2\\\nu_2\end{pmatrix}\cos\omega_2$$
$$\cos\omega_2=\alpha_2\cdot\lambda_2+\beta_2\cdot\mu_2+\gamma_2\cdot\nu_2 \quad (3)$$

wherein:
$\omega_2$ represents the angle formed by ($\alpha_2$, $\beta_2$, $\gamma_2$) and ($\lambda_2$, $\mu_2$, $\nu_2$).

$$\begin{pmatrix}\alpha_4\\\beta_4\\\gamma_4\end{pmatrix}=\begin{pmatrix}\alpha_3\\\beta_3\\\gamma_3\end{pmatrix}-2\begin{pmatrix}\lambda_3\\\mu_3\\\nu_3\end{pmatrix}\cos\omega_3$$
$$\cos\omega_3=\alpha_3\cdot\lambda_3+\beta_3\cdot\mu_3+\gamma_3\cdot\nu_3 \quad (4)$$

wherein:
$\omega_3$ represents the angle formed by ($\alpha_3$, $\beta_3$, $\gamma_3$) and ($\lambda_3$, $\mu_3$, $\nu_3$).

$$\begin{pmatrix}\alpha_b\\\beta_b\\\gamma_b\end{pmatrix}=1.5\begin{pmatrix}\alpha_4-\lambda\cos\omega_4\\\beta_4-\mu\cos\omega_4\\\gamma_4-\nu\cos\omega_4\end{pmatrix}-\begin{pmatrix}\lambda\\\mu\\\nu\end{pmatrix}\sqrt{1-1.5^2(1-\cos^2\omega_4)}$$
$$\cos\omega_4=\alpha_4\cdot\lambda+\beta_4\cdot\mu+\gamma_4\cdot\nu \quad (5)$$

wherein:
$\omega_4$ represents the angle formed by ($\alpha_4$, $\beta_4$, $\gamma_4$) and ($\lambda$, $\mu$, $\nu$).

As stated previously, the reflecting element of the conventional light reflector is constructed with a right-angled trigonal pyramidal member. Accordingly, the respective normal lines of the three planes of the reflecting element cross each other at right angle. Therefore, the respective direction cosines of the normal lines of these three planes will be as follows:

$$\begin{matrix}(\lambda_1,\mu_1,\nu_1)=(0,0,1)\\(\lambda_2,\mu_2,\nu_2)=(1,0,0)\\(\lambda_3,\mu_3,\nu_3)=(0,1,0)\end{matrix} \quad (6)$$

Now, in order to compare the direction cosines ($\alpha_1$, $\beta_1$, $\gamma_1$) of the light rays incident to the reflecting element with the direction cosines ($\alpha$, $\beta_4$, $\gamma_4$) of the light rays emitting from this reflecting element, the Equations (2), (3), (4) are substituted by the Equation (6). The, the following result of computations is obtained:

$$\begin{pmatrix}\alpha_2\\\beta_2\\\gamma_2\end{pmatrix}=\begin{pmatrix}\alpha_1\\\beta_1\\\gamma_1\end{pmatrix},\begin{pmatrix}\alpha_3\\\beta_3\\\gamma_3\end{pmatrix}=\begin{pmatrix}\alpha_1\\\beta_1\\\gamma_1\end{pmatrix},\begin{pmatrix}\alpha_4\\\beta_4\\\gamma_4\end{pmatrix}=\begin{pmatrix}\alpha_1\\\beta_1\\\gamma_1\end{pmatrix}$$

Thus, it will be understood that $\alpha_1$, $\beta_1$ and $\gamma_1$ are parallel with $\alpha_4$, $\beta_4$ and $\gamma_4$, respectively, because of the fact that the direction cosines of one of these two groups are opposite to the other of the groups only in their direction, but that their angle components are the same. In case the front surface of the light reflector is planar, the $\theta$ is equal to $\phi$ in FIG. 1, and accordingly, the light rays incident to the reflector will be parallel with the light rays emitting from this reflector.

In view of the foregoing fact, the conventional light reflector has its front surface prepared in semi-spherical or arcuate shape to thereby distribute the reflecting light rays as stated previously. Therefore, the conventional light reflectors have various shortcomings which result from the provision of semi-spherical or arcuate shape front surface of the reflector.

In constrast to the light reflectors of the prior art, the present invention is characterized by the face that the reflecting element is constructed with three reflecting planes in such a way that the respective normal lines of these three planes are deflected through a desired angle from the optical axes X, Y, Z which cross each other at right angle.

Figure 3:
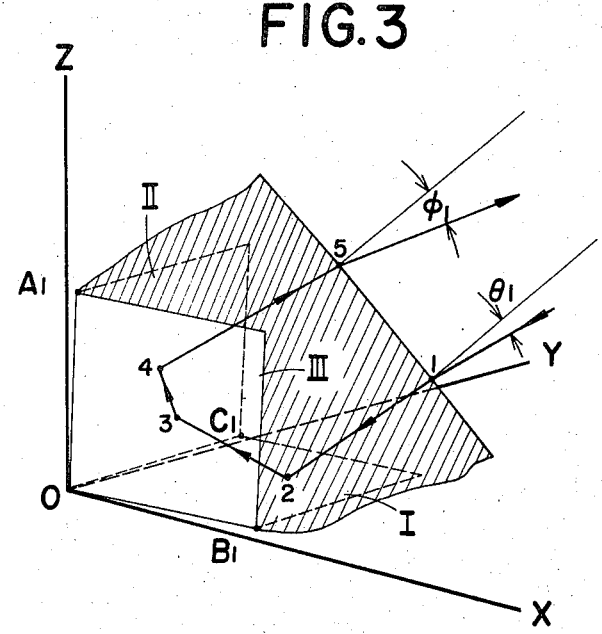
Figure 4:
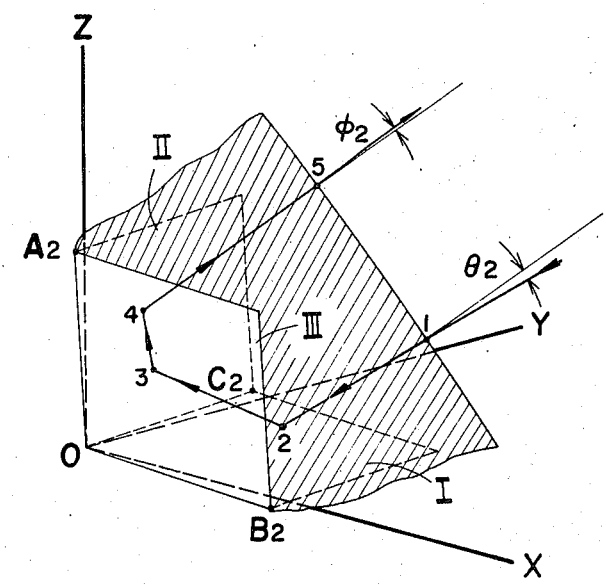

It should be understood that the respective normal lines of the three reflecting planes deviate from the axes X, Y, Z in the following two ways. FIG. 3 shows an instance wherein the normal lines deviate to the positive (+) side, and FIG. 4 shows an instance wherein they are deflected to the negative (−) side of these axes.

By setting the respective normal lines of the three reflecting planes (I), (II) and (III) of FIG. 1 too cross each other on the positive (+) side of the optical axes X, Y, Z which, in turn, cross each other at right angles, it is possible to make a reflecting element having its edge lines $OA_1$, $OB_1$, $OC_1$ in skewed with respect to the axes Z, X, Y, respectively, as shown in FIG. 3. In this instance, the direction cosines of the reflecting planes (I), (II), (III) can be expressed by the following equations. The angle of deviation of the normal lines of the reflecting planes of the reflecting element of the present invention from those of the conventional reflecting element is designated as $\delta$.

$$(\lambda_1, \mu_1, \nu_1) = \left(-\frac{\sin \delta}{\sqrt{2}}, -\frac{\sin \delta}{\sqrt{2}}, \cos \delta\right)$$
$$(\lambda_2, \mu_2, \nu_2) = \left(\cos \delta, -\frac{\sin \delta}{\sqrt{2}}, -\frac{\sin \delta}{\sqrt{2}}\right)$$
$$(\lambda_3, \mu_3, \nu_3) = \left(-\frac{\sin \delta}{\sqrt{2}}, \cos \delta, -\frac{\sin \delta}{\sqrt{2}}\right) \quad (7)$$

By setting these factors and also the direction cosines $(\alpha_1, \beta_1, \gamma_1)$ of the light rays incident to the reflecting element, it is possible to calculate, from the equations (2), (3) and (4), the direction cosines $(\alpha_4, \beta_4, \gamma_4)$ of the light rays emitting from the reflecting element. Also, by designating the angle formed by the light rays incident to the reflecting element and by the light rays emitting from the reflecting element as $\epsilon$, this $\epsilon$ can be sought from the following equation:

$$\cos \epsilon = \alpha_1 \cdot \alpha_4 + \beta_1 \cdot \beta_4 + \gamma_1 \cdot \gamma_4 \quad (8)$$

Now, a discussion will be made hereunder concerning the instance wherein the light reflector has a planar surface. The diffusion angle $\eta$ of such a reflector will be:

$$\sin \eta = 1.5 \sin \epsilon \quad (9)$$

From the above equation, it will be noted that this angle $\eta$ of diffusion acquires a large value even where this $\epsilon$ is small in value.

On the other hand, when the respective normal lines of the three reflecting planes (I), (II), (III) of FIG. 1 are set so that they cross each other on the negative (−) side of the optical axes X, Y, Z which cross at right angle, there is obtained a reflecting element having edge lines $OA_2$, $OB_2$, $OC_2$ which are not in agreement with the respective axes Z, X and Y. In this instance, the direction cosines of the three reflecting planes (I), (II) and (III) can be expressed by the following equations:

$$(\lambda_1, \mu_1, \nu_1) = \left(\frac{\sin \delta}{\sqrt{2}}, \frac{\sin \delta}{\sqrt{2}}, \cos \delta\right)$$
$$(\lambda_2, \mu_2, \nu_2) = \left(\cos \delta, \frac{\sin \delta}{\sqrt{2}}, \frac{\sin \delta}{\sqrt{2}}\right) \quad (10)$$
$$(\lambda_3, \mu_3, \nu_3) = \left(\frac{\sin \delta}{\sqrt{2}}, \cos \delta, \frac{\sin \delta}{\sqrt{2}}\right)$$

wherein: the deviation angle from the conventional reflector is likewise designated as $\delta$.

From the above equations, it is possible to calculate the angle formed by the light rays incident to the reflecting element and by the light rays emitting from this reflecting element. Therefore, the angle of diffusion of this light reflector can determined in a like manner.

As stated above, the relation between the incident light and the reflecting light where the front surface of the reflector is planar is expressed by $\theta = \phi$ in the case of the conventional light reflector shown in FIG. 1. In contrast, in the case of FIG. 3, this relation will be $\phi_1 - \theta_1 > 0$; and in the case of FIG. 4, the relation will become $\theta_2 \pm \phi_2 > 0$. In this way, the reflecting light rays can be diffused. Accordingly, by setting the value of $\delta$ of the equations (7) and (10) in such a way as to meet the practical purposes, there can be secured traffic safety as required.

Figure 6:
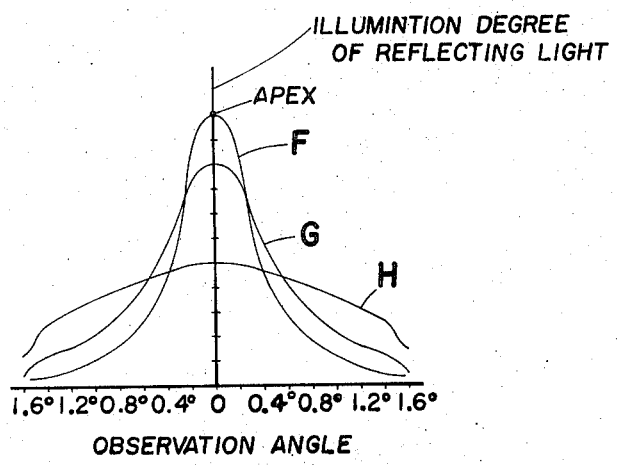
FIG. 6 is a chart of characteristic curves showing the relations between the observation angle and the illumination degree of the reflecting light rays of the light reflector.

FIG. 6 shows a chart of characteristic curves, showing this relation between the observation angle and the illumination degree of the reflecting light rays of reflectors. In this drawing, F represents the light rays distribution characteristic of the conventional light reflector having the reflecting element of the prior type as shown in FIG. 1 and having a semi-spherical front surface. It will be noted that when the reflector is to be viewed at a long distance with a small observation angle, the degree of illumination of the reflecting light of this reflector is high, whereas the degree of illumination is low in case the observation angle is large. Therefore, it may be said that the practicability of such a light reflector as this is almost equal for both views at long distance and at short distance as stated previously.

Figure 5:
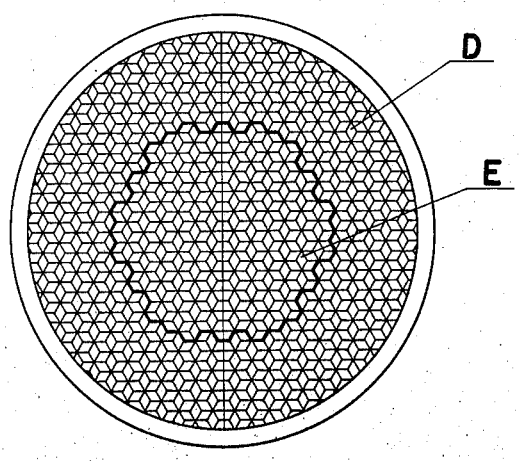
FIG. 5 is a rear side view of an example of the light reflector to which the light diffusing method of the present invention is applied.

FIG. 5 is a rear side view of a modified example of the light reflector embodying the method of the present invention. In this example, two groups of reflecting elements having different angles of normal lines of the three reflecting planes are provided in the central region D and the marginal region E which surrounds said central region D, and these two groups are defined by the thick bordering lines. In this example, those reflecting elements whose respective normal lines of the respective three reflecting planes cross each other on the positive (+) side of the optical axes X, Y, Z as shown in FIG. 3 are arranged in the central region D, and those having normal lines crossing each other on the negative (−) side of the optical axes are positioned in the marginal region E. The said characteristic curve of such a reflector will be as shown by H in FIG. 6.

Furthermore, if the reflecting elements of the known light reflector shown in FIG. 1 are arranged in the central region D and the front surface corresponding to this region is provided in a semi-spherical shape and those reflecting elements of the type shown in either FIG. 3 or FIG. 4 are positioned in the marginal region E, the characteristic curve will be that of G.

As stated above, by arranging the reflecting elements obtained according to the present invention and also the conventional reflecting elements in separate regions, or by arranging those reflecting elements having normal lines with smaller angle of deviation and those reflecting elements having normal lines with greater angle of deviation in separate regions, or by arranging the elements in such a way that those reflecting elements obtained according to the present invention are positioned in the marginal region, it is possible to obtain a light reflector which provides a better visibility as the distance between the reflector and the person decreases.

In FIG. 6, in order to have the apex of each of the characteristic curves G and H lie at the same level with that of F, it is only necessary to enlarge the effective reflecting planes of the reflector in such a way that G is larger than F, and that H is larger than either one of F and G.

I claim:

1. A light reflector comprising the combination of a light transmitting reflecting member, said member having a smooth front surface and a rear surface, a plurality of reflecting elements formed on said rear surface, said reflecting elements being of two varieties, a first variety comprised of reflecting elements having three reflecting planes positioned such that lines normal thereto intersect each other at right angles wherein reflected light rays are reflected therefrom in a direction parallel to light incident thereon and a second variety of reflecting elements having three reflecting planes positioned such that lines normal thereto intersect in a skewed manner while optical axes thereof intersect each other at right angles, wherein light rays incident thereon are reflected therefrom in a skewed direction relative to said incident rays, said first variety of reflecting elements being positioned centrally of said rear surface and said second variety of reflecting elements being positioned in the surrounding said central region, whereby light is diffused to provide comprehensive viewing of said reflector from locations not in line with incident light source and said reflector.

* * * * *